Figure 1:
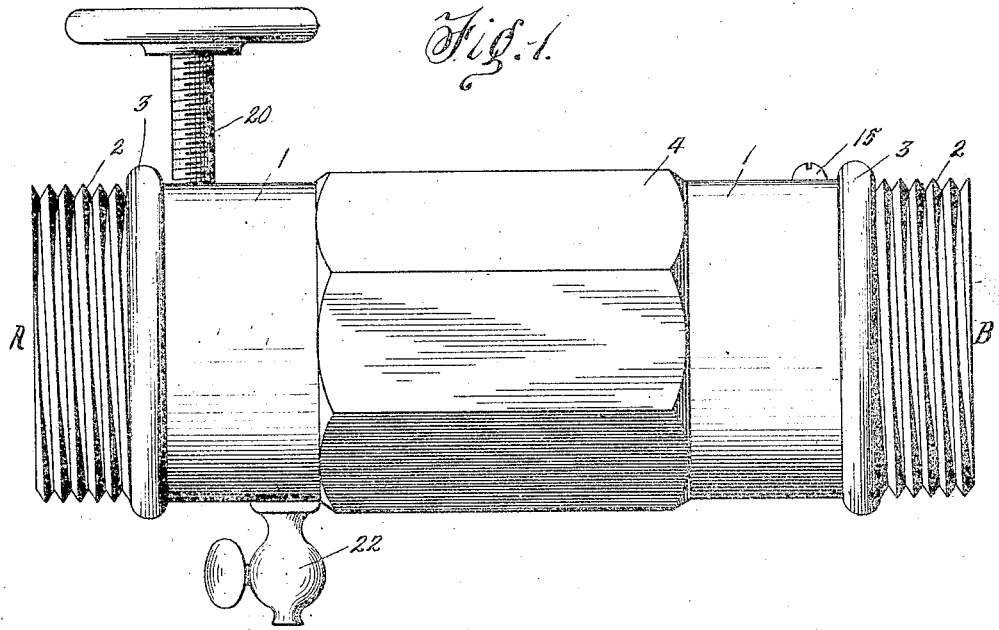

R. S. DIMOND.
REGULATOR.
APPLICATION FILED MAR. 13, 1909.

938,372.

Patented Oct. 26, 1909.
2 SHEETS—SHEET 1.

Witnesses
R. L. Farrington
R. H. Butler

Inventor
R. S. Dimond

By H. C. Everts
Attorneys

E. S. DIMOND.
REGULATOR.
APPLICATION FILED MAR. 13, 1909.
938,372.
Patented Oct. 26, 1909.
2 SHEETS—SHEET 2.
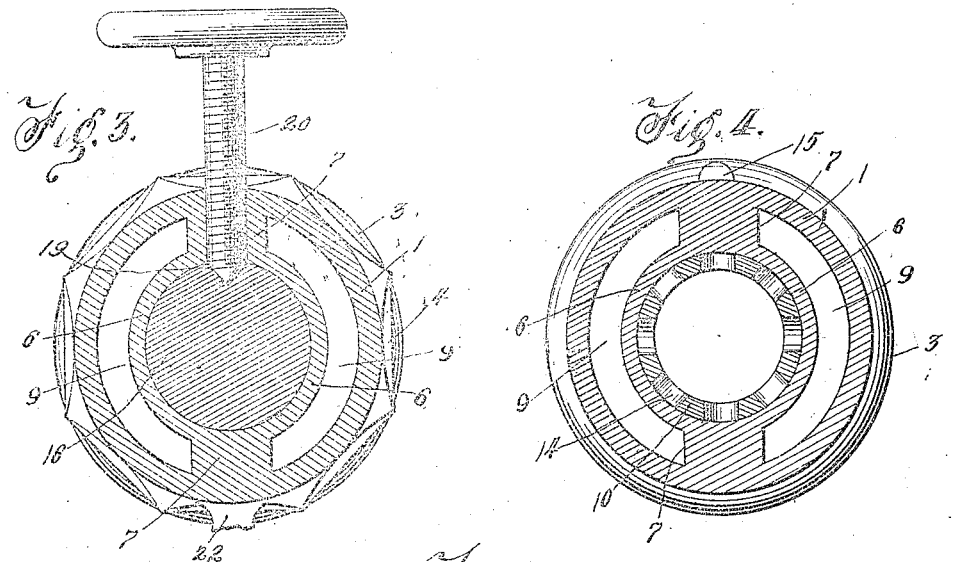
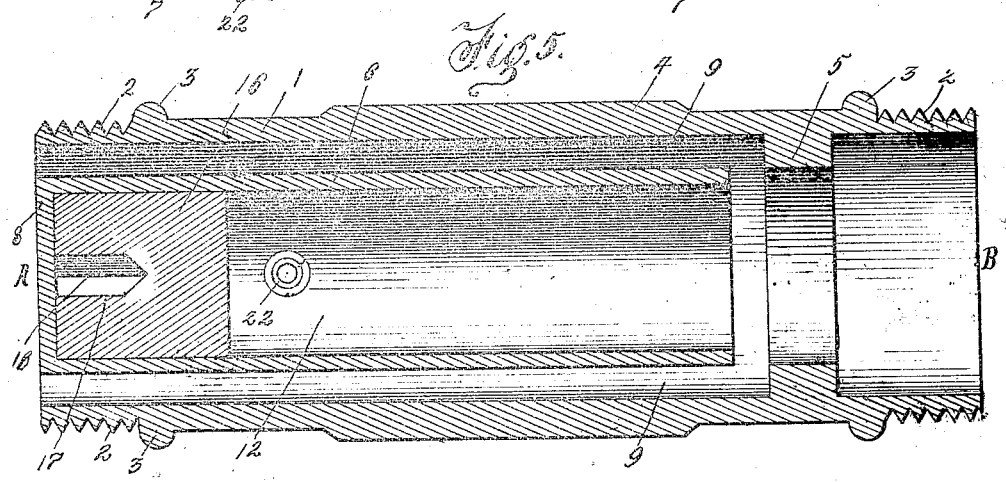
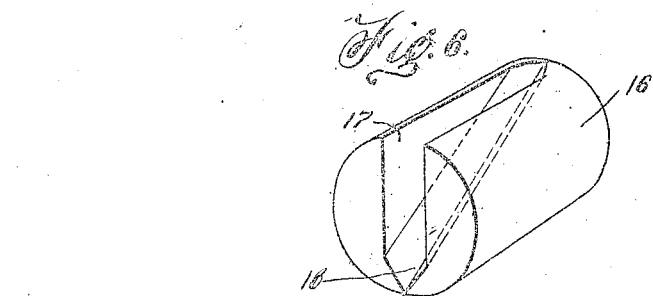
Inventor
R. S. Dimond
Witnesses
By
Attorneys

UNITED STATES PATENT OFFICE.

ROBERT S. DIMOND, OF SOUTH GREENSBURG, PENNSYLVANIA, ASSIGNOR OF ONE-HALF TO ARTHUR C. HUNKER, OF GREENSBURG, PENNSYLVANIA.

REGULATOR.

938,372.   Specification of Letters Patent.   Patented Oct. 26, 1909.

Application filed March 13, 1909. Serial No. 483,311.

*To all whom it may concern:*

Be it known that I, ROBERT S. DIMOND, a citizen of the United States of America, residing at South Greensburg, in the county of Westmoreland and State of Pennsylvania, have invented certain new and useful Improvements in Regulators, of which the following is a specification, reference being had therein to the accompanying drawing.

This invention relates to regulators, and more particularly to a regulator that can be used for controlling the pressure of steam, water, gas or air.

The object of my invention is to reduce high pressure of any degree to a safe and economical working point.

The application of the regulator for use in connection with steam, water, gas and air is as follows: First, in connection with steam for heating, cooking, drying, etc. only a circulating pressure is required; second, in connection with water, to keep the pressure off the spigots and fixtures in the water supply of a house when not in use, I furnish water at a normal pressure while being drawn for use; third, in connection with gas, to prevent unnecessary pressure on gas fixtures when closed and to furnish a steady and constant supply as fast as consumed, thus avoiding danger, leakage and waste; fourth, in connection with air, to reduce the compressed air from the high pressure required for pneumatic work to a point available for office and laboratory services, as cleaning, drying, cooling, aerating water, chemicals, etc. and for blow pipe work, and similar utilities; fifth, as a governor for small steam engines or pumps requiring steam below the initial or boiler pressure; and sixth, to maintain any desired height in a water column to suit the weight of water in use.

Of the above applications of the regulator, it is most advantageously used to prevent unnecessary pressure of gas fixtures when closed and to furnish a steady and constant supply only as fast as consumed. I am aware of regulators having been used for this purpose, but the most of the regulators simply reduce the volume and have but little effect on the pressure. The regulators are furnished in various sizes to suit all kinds of work, made of strong and durable material and furnished with springs of various tensions to cover a wide range of pressure, giving each regulator perfect control of the scope of work varying from a few ounces to a point above the limit of low pressure.

The invention will be hereinafter described in detail and specifically pointed out in the appended claims, and reference will now be had to the drawings wherein there is illustrated a preferred embodiment of the invention, but it is to be understood that the structural elements thereof can be varied or changed without departing from the spirit and scope of the invention.

Figure 2:
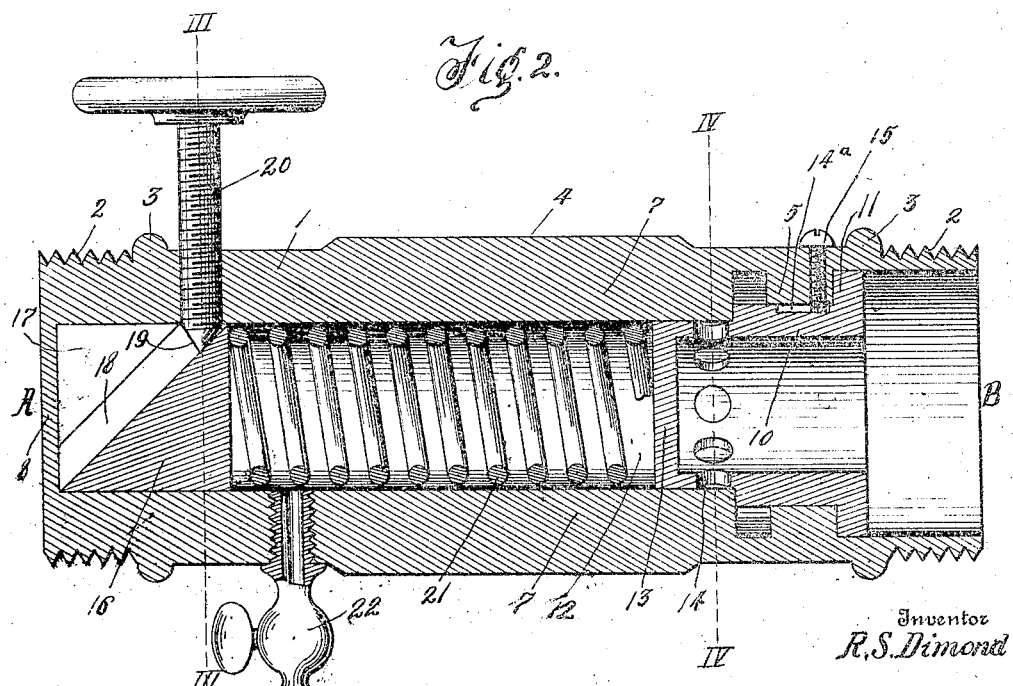

In the drawings:—Figure 1 is an elevation of a regulator constructed in accordance with my invention, Fig. 2 is a longitudinal vertical sectional view of the same, Fig. 3 is a cross sectional view of the regulator taken on the line III—III of Fig. 2, Fig. 4 is a similar view taken on the line IV—IV of Fig. 2, Fig. 5 is a longitudinal horizontal sectional view of a portion of the regulator, and Fig. 6 is a perspective view of a tension block used in connection with the regulator.

In the drawings, 1 designates a tubular body having the ends thereof exteriorly threaded, as at 2, in order that the regulator can be interposed, the end A constituting the high pressure end of the regulator, and the end B the low pressure end thereof. The body 1 adjacent to the threads 2 is provided with annular beads 3, and intermediate the ends thereof with an octagon-shaped enlargement 4 to permit of a wrench being easily used when placing the regulator in position on the pressure line.

The tubular body 1 adjacent to the low pressure end thereof is provided with an interior annular collar 5 and extending from the high pressure end of the regulator into proximity to the collar 5 is a cylindrical shell or cylinder 6, which is connected to the tubular body 1 by longitudinally disposed ribs 7, said ribs corresponding in length to the cylinder 6. This cylinder at the high pressure end of the regulator is closed, as at 8, and the interior diameter of said cylinder is less than the inner diameter of the collar 5, whereby the open end of the cylinder will serve as a seat for a piston, to be hereinafter described.

Through the medium of the longitudinally oppositely disposed ribs 7, the tubular body 1 is divided into two oppositely disposed semi-cylindrical inlet ports 9, said ports communicating with one another at the low pressure end of the cylinder 6 adjacent to the collar 5.

Slidably mounted in the collar 5 at the low pressure end B of the regulator is a tubular piston 10 having the low pressure end thereof provided with a peripheral flange 11 and adapted to snugly fit within the low pressure end of the body 1, and with the piston in a closed position, said flange is adapted to engage the collar 5. The high pressure end of the piston is reduced to engage in the bore 12 of the cylinder 6, and this end of the piston is closed, as at 13, and the reduced portion thereof provided with a plurality of circumferentially arranged radially disposed openings 14, the object of which will presently appear.

To limit the movement of the tubular piston 10 within the body 1, the periphery of said piston engaging the collar 5 is provided with a longitudinal groove 14ª to receive the inner end of a set screw 15 detachably mounted in the body 1 and the collar 5.

In the high pressure end of the cylinder 6 is a cylindrical tension block 16 provided with a slot 17, having the bottom 18 thereof V-shaped in cross section, and receiving the pointed end 19 of tension regulating screw 20 adjustably mounted in the upper rib 7 and the body 1.

Interposed between the cylindrical tension block 16 and the closed end 13 of the piston 10, within the cylinder 6, is a coil spring 21, the tension of said spring being sufficient to normally maintain the piston 10 in an open position.

Tapped into the body 1 and the lower rib 7 and communicating with the bore 12 of the cylinder 6 is a pet cock 22, normally maintained in an open position to prevent a compression of air within the bore 12. In lieu of the pet cock 22 an ordinary tube or pipe can be used, or simply a port provided in the body 1 and the lower rib 7 that will communicate with the bore 12 of the cylinder 6.

Operation: As shown in Fig. 2 of the drawings, the piston 10 is in a closed position shutting off the high pressure end A of the regulator from the lower pressure end B thereof, and the piston remains in this position until normal conditions are reached in the low pressure end B of the regulator. Immediately upon the pressure in the low pressure end B of the regulator becoming normal, the tension of the spring 21 opens the piston 10 and allows the pressure from the inlet ports 9 to pass through the openings 14 of the piston into the low pressure end of the regulator.

It will be observed that with the piston 10 in a closed position the openings 14 are closed by the cylinder 6 and that the piston is set against the end of the cylinder and the collar 5, consequently the high pressure within the ports 9 cannot exert any influence under the control of the piston.

The tension of the spring 21 is easily and quickly regulated by adjusting the screw 20, and the expansion of the parts of the regulator are so nearly equal that trouble from this source is practically reduced to a minimum, while leakage on a properly constructed regulator does not exist.

It is thought that the operation and utility of the regulator will be fully understood from the foregoing description; it will be understood that the regulator is made of strong and durable metal, capable of withstanding high pressure.

Having now described my invention what I claim as new, is:—

1. A regulator of the type described comprising a hollow body having an open outlet end and a partially closed inlet end, a cylinder arranged concentrically within said body, said cylinder extending from the inlet end of the body to a point in close proximity to the outlet end, said cylinder being closed at the inlet end of the body and open at its other end, ribs connecting the cylinder with the body on opposite sides of the cylinder, a collar within the body adjacent the outlet end thereof, a piston slidably mounted in said collar and having a reduced inner end received in the open end of the cylinder, said reduced end of the piston being provided with peripheral openings, means for limiting the longitudinal movement of the piston, a spring between the inner end of the piston and the closed end of the cylinder, and means for regulating the tension of said spring.

2. A regulator of the type described, comprising a body, an annular collar arranged within said body adjacent one end thereof, a cylinder arranged within said body and extending from the other end thereof to a point in close proximity to said collar and being closed at one end, longitudinal oppositely disposed ribs supporting said cylinder and corresponding in length thereto, a tubular piston slidably mounted in one end of said body and open end of said cylinder and engaging said collar, said piston having a plurality of circumferentially arranged openings formed therein adapted to communicate with the space between said cylinder and said body, a tension block arranged in the closed end of said cylinder, said block having a groove formed therein provided with an inclined bottom, a tension regulating screw arranged in said body and engaging the bottom of said groove for moving said block, and a coil spring located in said cylinder between said tension block and said piston.

3. A regulator of the type described, comprising a tubular body, an annular collar within said body adjacent one end thereof, a cylinder arranged within said body and extending from the opposite end thereof to a point in close proximity to said collar, the outer end of said cylinder being closed and the inner end thereof being open, longitudinal oppositely disposed ribs supporting said cylinder and corresponding in length thereto, a tubular piston slidably mounted in one end of said body and having its inner end received in the open end of said cylinder, said piston having a plurality of circumferentially arranged openings formed therein adapted to communicate with the space between said cylinder and said body, a tension block arranged in the closed end of said cylinder, said block having a groove provided with an inclined bottom, a tension regulating screw arranged in said body and engaging the bottom of said groove for moving said block, a coil spring located in said cylinder between said tension block and said piston, and a pet cock carried by said body and communicating with said cylinder.

4. A regulator of the type described, comprising a body, an annular collar arranged within said body adjacent one end thereof, a cylinder arranged within said body and extending from the inlet end of the body to a point in close proximity to said collar, the inner end of said cylinder being open, longitudinal oppositely disposed ribs supporting said cylinder and corresponding in length thereto, a tubular piston slidably mounted in the outlet end of said body within said collar and having its inner end received in said cylinder, said piston having a plurality of circumferentially arranged openings formed therein adapted to communicate with the space between said cylinder and said body, a tension block arranged in the inlet end of said cylinder, said block having a groove formed therein provided with an inclined bottom, a tension regulating screw arranged in said body and engaging the bottom of said groove for moving said block, a coil spring located in said cylinder between said tension block and said piston, a pet cock carried by said body and communicating with said cylinder, and means carried by said body and engaging said piston for limiting the movement thereof.

5. In a fluid pressure regulator, a hollow body having an inlet and an outlet in the opposite ends thereof, a collar within the body adjacent the outlet end thereof, a cylinder within the body extending from the inlet end thereof to a point in close proximity to said collar, said cylinder being closed at the inlet end of the body and open at its other end, means connecting the cylinder with the body and supporting said cylinder concentrically of the body, a piston slidably mounted in the collar having an open outlet end and a closed inner end, the closed inner end of the piston being received within the open end of said cylinder, said cylinder provided at its inner end with peripheral openings, said openings being closed when the cylinder is in one position by the walls of the cylinder and being in communication with the space between the cylinder and body when the piston is in another position, means for limiting the longitudinal movement of the piston, a spring arranged between the closed end of the piston and the closed end of the cylinder, and means for regulating the tension of said spring.

6. In a fluid pressure regulator, a hollow body having an inlet at one end and an outlet at the other end thereof, a cylinder concentrically arranged within the body and extending from the inlet end thereof to a point near the outlet end of said body, said cylinder being closed at the inlet end of the body and open at its other end, a piston slidably mounted in the body at the outlet end thereof, said piston having an open outer end and a closed inner end and being provided adjacent said closed inner end with a peripheral opening, means for limiting the longitudinal movement of the piston in the body, a spring arranged between the closed inner end of the piston and the closed end of the cylinder, and means for regulating the tension of said spring.

In testimony whereof I affix my signature in the presence of two witnesses.

ROBERT S. DIMOND.

Witnesses:
ARTHUR C. HUNKER,
MAX H. SROLOVITZ.